(12) United States Patent
Peffer et al.

(10) Patent No.: US 9,162,901 B2
(45) Date of Patent: Oct. 20, 2015

(54) ELECTROLYTIC PRODUCTION OF METAL OXIDES

(71) Applicant: PPG Industries Ohio, Inc., Cleveland, OH (US)

(72) Inventors: Robin Peffer, Valencia, PA (US); Michael J. Pawlik, Glenshaw, PA (US); Jane Valenta, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 13/803,076

(22) Filed: Mar. 14, 2013

(65) Prior Publication Data

US 2014/0272414 A1 Sep. 18, 2014

(51) Int. Cl.
| | | |
|---|---|---|
| *C01G 23/053* | (2006.01) | |
| *C01G 25/02* | (2006.01) | |
| *C25B 1/00* | (2006.01) | |
| *C01B 13/28* | (2006.01) | |
| *C01B 13/36* | (2006.01) | |

(52) U.S. Cl.
CPC ................ *C01G 25/02* (2013.01); *C01B 13/28* (2013.01); *C01B 13/36* (2013.01); *C01G 23/0536* (2013.01); *C25B 1/00* (2013.01); *C01P 2004/03* (2013.01); *C01P 2004/62* (2013.01); *Y10T 428/2982* (2015.01)

(58) Field of Classification Search
CPC ...... C01G 25/02; C01G 23/0536; C25B 1/00; C01B 13/28; C01B 13/36
USPC ........... 428/402; 427/212; 423/611; 205/333, 205/320
See application file for complete search history.

(56) References Cited

U.S. PATENT DOCUMENTS

| | | | |
|---|---|---|---|
| 5,378,400 A | * | 1/1995 | Parusel et al. ................... 516/88 |
| 6,676,821 B1 | * | 1/2004 | Hempelmann et al. ......... 205/74 |
| 7,780,931 B2 | | 8/2010 | Fait et al. |
| 2010/0290974 A1 | | 11/2010 | Hu et al. |
| 2012/0067733 A1 | | 3/2012 | Zhang-Beglinger et al. |

FOREIGN PATENT DOCUMENTS

CN 102758211 * 10/2012

OTHER PUBLICATIONS

Karakchiev, L.G. et al., "Low-Temperature Synthesis of Zirconium Titanate", Inorganic Materials; Apr. 1, 2001; pp. 386-390; vol. 37, No. 4.
Karakchiev, L.G. et al., "Sol of Hydrated ZrO2—TiO2 System", Colloid Journal; Jul. 1, 2001; pp. 426-430; vol. 63, No. 4.
Kim, S.-J. et al., Homogenous Precipitation of TiO2 Ultrafine Powders from Aqueous TiOCl2 Solution, J. Am. Ceram. Soc., 1999, pp. 927-932, vol. 82, No. 4.
Matthews, A., The crystallization of anatase and rutile from amorphous titanium dioxide under hydrothermal conditions, American Mineralogist, 1976, pp. 419-424, vol. 61.
Titanium Plating, finishing.com, 1995-2013 Web. Jan. 21, 2013, http://www.finishing.com/250/24.shtml.

* cited by examiner

*Primary Examiner* — Leszek Kiliman
(74) *Attorney, Agent, or Firm* — Julie Meder

(57) ABSTRACT

Disclosed is a method of producing metal oxides, comprising electrodepositing a metal oxide from an electrolyte solution onto a substrate to coat at least a portion of the substrate, whereby metal oxide seed particles are released into the solution, and precipitating metal oxide particles from the solution. The precipitated metal oxide particles have a maximum particle size of less than 1 micron.

10 Claims, 1 Drawing Sheet

ELECTROLYTIC PRODUCTION OF METAL OXIDES

FIELD OF THE INVENTION

This invention relates to methods of electrolytic precipitation of a metal oxide. In particular, the invention relates to electrolytic precipitation of titanium dioxide ($TiO_2$).

BACKGROUND OF THE INVENTION

Metal oxides such as titanium dioxide and zinc oxide are commonly used in several industrial fields. For example, $TiO_2$ is used as an opacifier and/or white pigment in the coatings industry, as filler material in plastics, and as a photocatalyst for removing environmental pollutants. In the coatings industry, $TiO_2$ pigments provide efficient scattering of light to impart brightness and opacity. Titanium dioxide is typically commercially available in the anatase and rutile crystalline forms. Rutile $TiO_2$ is particularly desired because it scatters light more effectively and is more durable than the anatase form.

$TiO_2$ (rutile and anatase) has traditionally been produced by two commercial processes, referred to as the "sulfate process" in which titanium ore is treated with sulfuric acid followed by crystallization and precipitation of $TiO_2$ and the "chloride process" in which titanium ore is treated with chlorine gas to produce an intermediate of $TiCl_4$, which is oxidized to form $TiO_2$. The cost of producing $TiO_2$ from these traditional processes has increased significantly and alternative routes for obtaining $TiO_2$ are being sought.

SUMMARY OF THE INVENTION

The present invention includes a method of producing metal oxide particles, comprising electrodepositing a metal oxide from an electrolyte solution onto a substrate to coat at least a portion of the substrate, whereby metal oxide seed particles are released into the solution; and precipitating metal oxide particles from the solution. Also included in the present invention is a pigment composition comprising rutile $TiO_2$ particles, wherein the particles are produced by electrolytic precipitation from an electrolyte composition comprising titanium oxychloride ($TiOCl_2$).

DETAILED DESCRIPTION OF THE INVENTION

Figure 1:
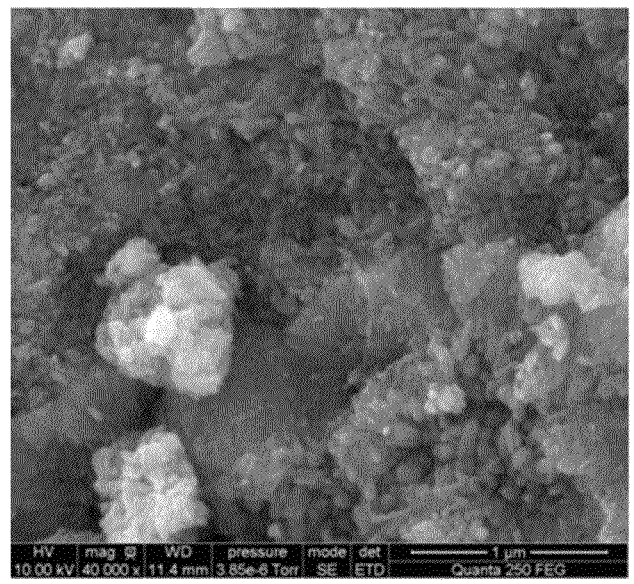
FIG. 1 is a scanning electron microscope image of $TiO_2$ particles produced according to the present invention.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

In one embodiment of the present invention, metal oxide particles are obtained in an electrolytic process in which a cathode (which may be composed of stainless steel) is electroplated with a metal oxide using a non-consumable anode (which may be composed of stainless steel or graphite). In an electrolytic cell containing an electrolyte solution, upon application of an electric current to the anode, the metal oxide plates out onto the cathode. The metal oxide formed on the cathode then seeds precipitation of metal oxide particles from the electrolyte solution.

Metal oxides that can be electrodeposited onto a substrate and precipitate as metal oxide particles include oxides of alkaline earth metals (such as magnesium), transition metals (such as titanium and zirconium) and rare earth metals (such as cerium). The metal oxide forms on the cathode of an electrolytic cell, where the cell contains an aqueous solution of a salt of the metal.

In one embodiment, a soluble salt of titanium can be electrodeposited from an electrolytic solution onto a cathode as $TiO_2$ and precipitated therefrom. A suitable soluble salt of titanium is $TiOCl_2$. Other soluble salts of metals can be use to electrodeposit a metal oxide onto a substrate, such as zirconium oxide ($ZrO_2$) electrodeposited from a solution of zirconium oxychloride ($ZrOCl_2$). In general, suitable metals and soluble salts thereof useful in practicing the present invention may be those that form a coordination complex, also referred to as a Werner complex, or, as will be understood by those skilled in the art, are otherwise selected to electrodeposit as a metal oxide. As such, it should be appreciated that while the present invention is described in reference to electrolytic precipitation of $TiO_2$, other metal oxides may be electrolytically precipitated according to the present invention from suitable aqueous solutions of salts of those metals.

It has been found that upon electrolytic deposition of $TiO_2$ from an electrolyte solution onto a substrate (the cathode), $TiO_2$ seed particles are released from the deposited $TiO_2$ into the solution and precipitate as $TiO_2$ particles, typically sized less than 1 micron. The electrolyte solution includes a soluble salt of titanium, such as $TiOCl_2$ and may further include a reducing agent. Suitable reducing agents include oxidizing anions, such as an alkali nitrate, e.g. sodium nitrate.

It has been found that $TiO_2$ particles will precipitate from electrolyte solutions containing 10 to 360 grams per liter (g/L) $TiOCl_2$ and 5 to 150 g/L sodium nitrate. By way of small scale example using a wire as a cathode, current densities of 0.3 to 1.5 amperes per square centimeter ($A/cm^2$) are sufficient to accomplish precipitation of $TiO_2$ according to the present invention. Electrolytic cell design and operating parameters thereof for larger scale production of metal oxides via the electrolytic precipitation method of the present invention will be appreciated by one skilled in the art. It has been found that the temperature of the electrolyte solution may be adjusted to control the particle size and particle size distribution of the precipitated $TiO_2$ particles. For example, in one embodiment, when the electrolyte solution is less than 150° F., the precipitated $TiO_2$ particles have a maximum dimension of less than 1 micron, such as 100-700 nm or 250-300 nm or 100-250 nm. The precipitated $TiO_2$ is produced as discrete particles (either directly or with milling) in the rutile form that are substantially in the shape of a sphere or spheroid, meaning that the particles appear to the eye as being spherical or spheroid.

While $TiO_2$ may precipitate from a solution at elevated temperatures (over 150° F., typically at 185° F. or higher) without application of an electric current thereto, the resulting material normally forms agglomerates of particles, with the particles within the agglomerates having a primary particle size of over 1 micron, such as above 1.5 microns, which is unsuitable for use in coating applications and other end-uses. In the present invention, not only are the precipitated metal oxide particles discrete, the particle size may be tailored by adjusting the electrolyte solution temperature. For example, at electrolyte solution temperatures of 145° F., the average particle size of the discrete precipitated $TiO_2$ particles may be 100-250 nm.

The precipitated $TiO_2$ produced according to the present invention may be included in conventional end-uses for $TiO_2$ as a complete or partial replacement of $TiO_2$ obtained by conventional processes and may be surface treated as is conventional in producing $TiO_2$ for industrial use. Such surface treatment may enhance the compatibility of the precipitated $TiO_2$ in coating systems, including aqueous and non-aqueous coating compositions.

EXAMPLES

The following Examples are presented to demonstrate the general principles of the invention. All amounts listed are described in parts by weight, unless otherwise indicated. The invention should not be considered as limited to the specific Examples presented.

Example 1

A solution was made by adding 400 grams of deionized water into a glass beaker with a magnetic stir bar, and 100 grams of $TiOCl_2$ (available from Millennium Chemicals, Inc.) was slowly added to the deionized water. The solution was placed onto a magnetic stir plate capable of heating and agitation, then 40 grams of $NaNO_3$ (available from Acros Chemicals) was added to the solution and agitated for 15 minutes, giving a clear colorless solution. An electrolytic cell was applied to the solution. To the glass beaker, a four inch long ER316L 1/16" stainless welding rod was suspended in solution and connected to a power source as a cathode. A graphite bar (1 inch wide by 4 inches long) was suspended in the solution and connected as the anode. The glass beaker with solution, cathode and anode was placed into a water bath and under agitation the solution was heated to 130° F. At 130° F. the solution was then electrified by passing 3.5 amps and 25 volts for 300 seconds. The maximum voltage achieved was 4.67 volts during the deposition process. Following deposition the bath temperature reached 139° F. and turned from clear colorless to light yellow. The solution was heated to 145° F. and the light yellow solution turned cloudy light yellow. The solution was removed from heat and agitation at 168° F. and cooled to room temperature. Upon cooling a white precipitate formed from the cloudy light yellow solution. The precipitate was evaluated by scanning electron microscope (SEM) and an average particle size of 100-250 nm was observed as shown in the SEM image of FIG. 1.

Comparative Example

Figure 2:
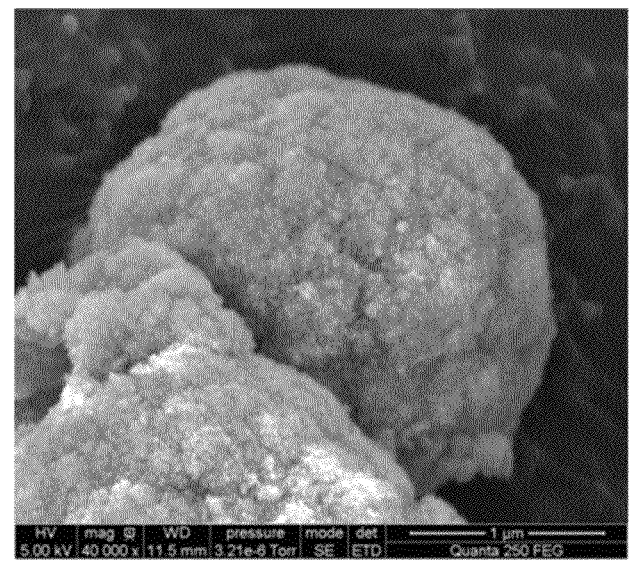
FIG. 2 is a scanning electron microscope image of $TiO_2$ particles produced according to the prior art.

Example 1 was repeated but without use of the electrolytic cell. The glass beaker with solution was placed into a water bath, and the solution was heated under agitation. At 145° F., the solution turned from clear colorless to clear slightly yellow and increased in yellow color until the solution turned a cloudy milky yellow color at 185° F. The solution was removed from heat and agitation at 185° F. and cooled to room temperature. Upon cooling, a white precipitate formed from the cloudy milky yellow solution. The precipitate was evaluated by SEM and aggregates of particles having an average particle size of 1.5 µm was observed as shown in the SEM image of FIG. 2. Milling the aggregates did not produce smaller discrete particles.

While the preferred embodiments of the present invention are described above, obvious modifications and alterations of the present invention may be made without departing from the spirit and scope of the present invention. The scope of the present invention is defined in the appended claims and equivalents thereto.

What is claimed:

1. A method of producing metal oxide particles comprising:
    electrodepositing an oxide of a metal from an electrolyte solution onto a substrate to coat at least a portion of the substrate, whereby seed particles of the metal oxide are released into the solution; and
    precipitating metal oxide particles from the solution,
    wherein the metal oxide comprises $TiO_2$, $ZrO_2$, and/or MgO.

2. The method of claim 1, wherein the electrolyte solution comprises a soluble salt of the metal.

3. The method of claim 1, wherein the metal oxide comprises $TiO_2$ and the electrolyte solution comprises $TiOCl_2$.

4. The method of claim 3, wherein the precipitated metal oxide particles comprise rutile $TiO_2$.

5. The method of claim 2, wherein the electrolyte solution further comprises an oxidizing anion.

6. The method of claim 5, wherein the oxidizing anion comprises an alkali nitrate.

7. The method of claim 1, wherein the temperature of the electrolyte solution during the electrodepositing step is less than 150° F.

8. The method of claim 1, wherein the substrate comprises stainless steel.

9. A method of producing metal oxide particles comprising:
    electrodepositing an oxide of a metal from an electrolyte solution onto a substrate to coat at least a portion of the substrate, whereby seed particles of the metal oxide are released into the solution; and
    precipitating metal oxide particles from the solution,
    wherein the diameter of the metal oxide particles is 100-700 nm.

10. The method of claim 9, wherein the diameter of the metal oxide particles is 100-250 nm.

* * * * *